US009240974B2

(12) United States Patent
Bao et al.

(10) Patent No.: US 9,240,974 B2
(45) Date of Patent: Jan. 19, 2016

(54) WIRELESS COMMUNICATION METHOD, SENDING DEVICE AND RECEIVING DEVICE

(75) Inventors: Dongshan Bao, Beijing (CN); Huijuan Yao, Beijing (CN); Yubao Zhou, Beijing (CN); Xiaoyan Yu, Beijing (CN); Shenfa Liu, Beijing (CN)

(73) Assignee: BEIJING NUFRONT MOBILE MULTIMEDIA TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 14/009,012

(22) PCT Filed: Mar. 16, 2012

(86) PCT No.: PCT/CN2012/072411
§ 371 (c)(1),
(2), (4) Date: Nov. 5, 2013

(87) PCT Pub. No.: WO2012/130050
PCT Pub. Date: Oct. 4, 2012

(65) Prior Publication Data
US 2014/0050230 A1   Feb. 20, 2014

(30) Foreign Application Priority Data

Mar. 31, 2011 (CN) .......................... 2011 1 0081288
Feb. 6, 2012 (CN) .......................... 2012 1 0025382

(51) Int. Cl.
H04W 4/00 (2009.01)
H04L 29/12 (2006.01)
(Continued)

(52) U.S. Cl.
CPC .............. H04L 61/6004 (2013.01); H04L 1/18 (2013.01); H04L 12/4633 (2013.01); H04L 61/6022 (2013.01); H04W 28/06 (2013.01); H04L 69/22 (2013.01); H04L 69/322 (2013.01); H04W 80/02 (2013.01)

(58) Field of Classification Search
None
See application file for complete search history.

(56) References Cited

U.S. PATENT DOCUMENTS 7,885,604 B2   2/2011   Wee et al.
7,978,732 B2   7/2011   Kim et al.
(Continued)

FOREIGN PATENT DOCUMENTS

CN   101 578 824   11/2009
CN   101 594 284   12/2009
(Continued)

Primary Examiner — Frank Duong
(74) Attorney, Agent, or Firm — Anova Law Group, PLLC

(57) ABSTRACT

Disclosed is a wireless communication method, comprising: determining a type of a media access control MAC frame header according to a type of a media access control protocol data unit MPDU; assigning a value to a function field in the MAC frame header to generate the MAC frame header; generating an MPDU, the MPDU at least comprising the MAC frame header; and encapsulating the MPDU and sending the encapsulated MPDU. Further disclosed are a transmitting device and a receiving device. By using the method and devices of the present invention, a signaling format having complete functions and compact structure and being easy to implement and extend is implemented, which is applicable to a newly defined medium-to-short distance wireless communication system, and reduces the complexity in processing. Moreover, the present invention is simple in processing, stable, convenient in resolving, and has low requirement on system performance, thereby implementing high-efficient transmission of services and increasing the utilization of air interface resources.

13 Claims, 6 Drawing Sheets

(51) Int. Cl.
*H04L 1/18* (2006.01)
*H04L 12/46* (2006.01)
*H04W 28/06* (2009.01)
*H04W 80/02* (2009.01)
*H04L 29/08* (2006.01)
*H04L 29/06* (2006.01)

(56) References Cited

U.S. PATENT DOCUMENTS

| | | | |
|---|---|---|---|
| 8,089,911 B2 | 1/2012 | Huang et al. | |
| 8,326,324 B2 | 12/2012 | Wu et al. | |
| 8,374,115 B2 | 2/2013 | Huang et al. | |
| 8,446,869 B2 | 5/2013 | Lee et al. | |
| 8,982,750 B2 | 3/2015 | Palanki et al. | |
| 2008/0075032 A1 | 3/2008 | Balachandran et al. | |
| 2008/0130538 A1* | 6/2008 | Raissinia et al. | 370/310 |
| 2009/0141670 A1* | 6/2009 | Duncan Ho | 370/328 |
| 2010/0238878 A1 | 9/2010 | Jang | |
| 2014/0198805 A1* | 7/2014 | Qi et al. | 370/474 |

FOREIGN PATENT DOCUMENTS

| | | |
|---|---|---|
| CN | 101 777 973 | 7/2010 |
| CN | 101 810 026 | 8/2010 |
| WO | 2010/095898 | 8/2010 |
| WO | 2010/107264 | 9/2010 |

\* cited by examiner

WIRELESS COMMUNICATION METHOD, SENDING DEVICE AND RECEIVING DEVICE

CROSS-REFERENCE TO RELATED APPLICATION

This application claims the benefit of a Chinese patent application No. 201110081288.6 filed on Mar. 31, 2011 and titled "WIRELESS COMMUNICATION METHOD", which is incorporated herein by reference in its entirety.

This application claims the benefit of a Chinese patent application No. 201210025382.4 filed on Feb. 6, 2012 and titled "WIRELESS COMMUNICATION METHOD AND DEVICE", which is incorporated herein by reference in its entirety.

TECHNICAL FIELD

The present invention relates to the field of wireless communication, especially relates to a wireless communication method, a transmitting device and a receiving device.

BACKGROUND OF THE INVENTION

In recent years, short distance wireless network technologies, including the Wireless Local Area Network WiFi technology based on IEEE 802.11 standards, a Bluetooth system based on IEEE 802.15, and a Femto technology orienting to indoor applications that is derived from the mobile communication system, have emerged.

With the rapid development of the wireless communication technology, there are more requirements for realizing the more suitable MAC layer solution in the wireless communication system.

SUMMARY OF THE INVENTION

In view of the above, the technical problem to be solved in the present invention is to provide a common MAC frame header with complete functions, which has a simple structure easy to realize and expand, and is specifically designed for and applicable to a newly defined mid-short distance wireless communication system. A brief summary is given below to provide a basic understanding of some aspects of the embodiments disclosed. This section of summary is not to provide a general commentary, not to determine the key or important elements, and not to describe the protection scopes of these embodiments, but is merely to simply present some concepts, which act as a preamble of the subsequent detailed illustration.

To solve the above technical problem, the invention further provides a wireless communication method, which includes steps of: receiving one or more flows at a first layer, where each of the flows includes one or more packets; generating, at a second layer, one or more MAC protocol data units (MPDUs) according to one or more packets from the one or more flows, where the MPDU includes a MAC frame head, a frame body, and a frame check sequence (FCS), and the MAC frame head includes a frame control field, a fragment number field, a sequence number field, a reserved field, a fragment indication field and a length field; and generating a physical frame at a third layer to transmit an MPDU generated at the second layer.

In some alternative embodiments, the frame body is used to carry data to be transmitted or a payload from the contents of a management message.

In some alternative embodiments, the frame control field includes a protocol version, a frame type, a sub-type, a flow identifier, retransmission, power saving, and reservation.

The protocol version is used to indicate the current standard protocol version number.

The frame type is used to identify the function type of the frame, and includes a data type and a management type.

The sub-type is used to identify the function of each type of frame.

The flow identifier is used to identify a service connection of a terminal.

The retransmission is used to assist in removing repeated frames.

The power saving is used to a power saving mode of the STA.

The length field is used to represent the total bytes of all fields following the length field.

The fragment indication is used to indicate whether any subsequent fragment follows.

The fragment number is used to indicate the number of each fragment of the MSDU.

The sequence number is used to indicate the sequence number of the MSDU.

To solve the above technical problem, the present application provides a wireless communication method including: determining the type of a MAC frame header according to the type of an MPDU; assigning values to function fields in the MAC frame header, to generate the MAC frame header; generating the MPDU, which includes at least the MAC frame header; and encapsulating and then sending the MPDU.

In some alternative embodiments, the type of the MPDU indicates two types of frames having different MAC frame header lengths.

In some alternative embodiments, the Length L1 of a MAC frame header of a first one of the two types of frames and the Length L2 of a MAC frame header of a second one of the two types of frames are fixed, and the length L1 is smaller than the length L2.

In some alternative embodiments, the MAC frame header of the first one of the two types of frames is composed of a field carrying protocol version information, a field carrying frame type information, a field carrying sub-type information and a field carrying flow identification information, wherein, the protocol version information is used to indicate the current standard protocol version;

the frame type information and the sub-type information are used to indicate the function type of the frame;

the flow identification information is used to indicate a specific uplink or downlink service flow to which the current frame pertains.

In some alternative embodiments, the MAC frame header of the first one of the two types of frames is composed of a field carrying frame type information, a field carrying sub-type information, a field carrying protocol version information, a field carrying flow identification information and a field carrying repeat indication information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is a retransmission version of a previous frame.

In some alternative embodiments, the MAC frame header of the second one of the two types of frames is composed of a field carrying protocol version information, a field carrying frame type information, a field carrying sub-type information, a field carrying flow identification information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate a number of each fragment in the MSDU or MMPDU;

the sequence number information is used to indicate a sequence number of the MSDU or MMPDU;

the fragment indication information is used to indicate if any subsequent fragment of the current MSDU or MMPDU exists;

the length information is used to indicate the total bytes of all fields between the MAC frame header field and the FCS field.

In some alternative embodiments, the MAC frame header of the second one of the two types of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is the retransmission version of a previous frame;

the fragment number information is used to indicate the number of each fragment in the MSDU or MMPDU;

the sequence number information is used to indicate the sequence number of the MSDU or MMPDU;

the fragment indication information indicates if any subsequent fragment of the current MSDU or MMPDU exists;

the length information is used to indicate the total bytes of all fields between the MAC frame header field and the FCS field.

In some alternative embodiments, the method further includes determining the type of the MPDU according to the contents to be sent.

In some alternative embodiments, the method further includes filling the frame body of the MPDU with a payload according to the contents to be sent, wherein the MPDU at least includes the MAC frame header and the frame body, and the payload includes one or more MSDUs, or one MMPDU, or one MSDU fragment, or one MMPDU fragment.

To solve the above technical problem, the present application provides a wireless communication method including:

receiving an MPDU, which at least includes a MAC frame header; and parsing the MPDU according to the MAC frame header, and determining the type of the MPDU.

In some alternative embodiments, the type of the MPDU indicates two types of frames having different MAC frame header lengths.

In some alternative embodiments, the Length L1 of a MAC frame header of a first one of the two types of frames and the Length L2 of a MAC frame header of a second one of the two types of frames are fixed, and the length L1 is smaller than the length L2.

In some alternative embodiments, the MAC frame header of the first one of the two types of frames is composed of a field carrying protocol version information, a field carrying frame type information, a field carrying sub-type information and a field carrying flow identification information, wherein, the protocol version information is used to indicate the current standard protocol version;

the frame type information and the sub-type information are used to indicate the function type of the frame;

the flow identification information is used to indicate a specific uplink or downlink service flow to which the current frame pertains.

In some alternative embodiments, the MAC frame header of the first one of the two types of frames is composed of a field carrying frame type information, a field carrying sub-type information, a field carrying protocol version information, a field carrying flow identification information and a field carrying repeat indication information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is a retransmission version of a previous frame.

In some alternative embodiments, the MAC frame header of the second one of the two types of frames is composed of a field carrying protocol version information, a field carrying frame type information, a field carrying sub-type information, a field carrying flow identification information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate a number of each fragment in the MSDU or MMPDU;

the sequence number information is used to indicate a sequence number of the MSDU or MMPDU;

the fragment indication information is used to indicate if any subsequent fragment of the current MSDU or MMPDU exists;

the length information is used to indicate the total bytes of all fields between the MAC frame header field and the FCS field.

In some alternative embodiments, the MAC frame header of the second one of the two types of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is the retransmission of a previous frame;

the fragment number information is used to indicate the number of each fragment in the MSDU or MMPDU;

the sequence number information is used to indicate the sequence number of the MSDU or MMPDU;

the fragment indication information indicates if any subsequent fragment of the current MSDU or MMPDU exists;

the length information is used to indicate the total bytes of all fields between the MAC frame header field and the FCS field.

In some alternative embodiments, the MPDU further comprises a frame body, and the method further comprises:

parsing the frame body and extracting a payload from the frame body, wherein the payload includes one or more MSDUs, or one MMPDU, or one MSDU fragment, or one MMPDU fragment.

To solve the above technical problem, the present application provides a transmitting device including:

a determination module, which is used to determine the type of a MAC frame header according to the type of an MPDU;

a first generation module, which is used for assigning values to function fields in the MAC frame header to generate the MAC frame header;

a second generation module, which is used to generate the MPDU, which at least includes the MAC frame header; and a sending module, which is used to encapsulate and then send the MPDU.

In some alternative embodiments, the type of the MPDU indicates two types of frames having different MAC frame header lengths.

In some alternative embodiments, the Length L1 of a MAC frame header of a first one of the two types of frames and the Length L2 of a MAC frame header of a second one of the two types of frames are fixed, and the length L1 is smaller than the length L2.

In some alternative embodiments, the MAC frame header of the first one of the two types of frames is composed of a field carrying protocol version information, a field carrying frame type information, a field carrying sub-type information and a field carrying flow identification information, wherein, the protocol version information is used to indicate the current standard protocol version;

the frame type information and the sub-type information are used to indicate the function type of the frame;

the flow identification information is used to indicate a specific uplink or downlink service flow to which the current frame pertains.

In some alternative embodiments, the MAC frame header of the first one of the two types of frames is composed of a field carrying frame type information, a field carrying sub-type information, a field carrying protocol version information, a field carrying flow identification information and a field carrying repeat indication information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is a retransmission of a previous frame.

In some alternative embodiments, the MAC frame header of the second one of the two types of frames is composed of a field carrying protocol version information, a field carrying frame type information, a field carrying sub-type information, a field carrying flow identification information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate a number of each fragment in the MSDU or MMPDU;

the sequence number information is used to indicate a sequence number of the MSDU or MMPDU;

the fragment indication information is used to indicate if any subsequent fragment of the current MSDU or MMPDU exists;

the length information is used to indicate the total bytes of all fields between the MAC frame header field and the FCS field.

In some alternative embodiments, the MAC frame header of the second one of the two types of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is the retransmission of a previous frame;

the fragment number information is used to indicate the number of each fragment in the MSDU or MMPDU;

the sequence number information is used to indicate the sequence number of the MSDU or MMPDU;

the fragment indication information indicates if any subsequent fragment of the current MSDU or MMPDU exists;

the length information is used to indicate the total bytes of all fields between the MAC frame header field and the FCS field.

In some alternative embodiments, the determination module is further used to determine the type of the MPDU according to the contents to be sent.

In some alternative embodiments, wherein, the second generation module is further used to fill the frame body of the MPDU with a payload according to the contents to be sent, the MPDU at least includes the MAC frame header and the frame body, and the payload includes one or more MSDUs, or one MMPDU, or one MSDU fragment, or one MMPDU fragment.

To solve the above technical problem, the present application provides a receiving device including:

a receiving module, which is used to receive an MPDU, which at least includes a MAC frame header; and a parsing module, which is used to parse the MPDU according to the MAC frame header and determine the type of the MPDU.

In some alternative embodiments, the type of the MPDU indicates two types of frames having different MAC frame header lengths.

In some alternative embodiments, the Length L1 of a MAC frame header of a first one of the two types of frames and the Length L2 of a MAC frame header of a second one of the two types of frames are fixed, and the length L1 is smaller than the length L2.

In some alternative embodiments, the MAC frame header of the first one of the two types of frames is composed of a field carrying protocol version information, a field carrying frame type information, a field carrying sub-type information and a field carrying flow identification information, wherein, the protocol version information is used to indicate the current standard protocol version;

the frame type information and the sub-type information are used to indicate the function type of the frame;

the flow identification information is used to indicate a specific uplink or downlink service flow to which the current frame pertains.

In some alternative embodiments, the MAC frame header of the first one of the two types of frames is composed of a field carrying frame type information, a field carrying sub-type information, a field carrying protocol version information, a field carrying flow identification information and a field carrying repeat indication information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is a retransmission of a previous frame.

In some alternative embodiments, the MAC frame header of the second one of the two types of frames is composed of a field carrying protocol version information, a field carrying frame type information, a field carrying sub-type information, a field carrying flow identification information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate a number of each fragment in the MSDU or MMPDU;

the sequence number information is used to indicate a sequence number of the MSDU or MMPDU;

the fragment indication information is used to indicate if any subsequent fragment of the current MSDU or MMPDU exists;

the length information is used to indicate the total bytes of all fields between the MAC frame header field and the FCS field.

In some alternative embodiments, the MAC frame header of the second one of the two types of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the repeat indication information is used to indicate whether the current frame is the retransmission version of a previous frame;

the fragment number information is used to indicate the number of each fragment in the MSDU or MMPDU;

the sequence number information is used to indicate the sequence number of the MSDU or MMPDU;

the fragment indication information indicates if any subsequent fragment of the current MSDU or MMPDU exists;

the length information is used to indicate the total bytes of all fields between the MAC frame header field and the FCS field.

In some alternative embodiments, the MPDU also includes a frame body, and the parsing module is further used to parse the frame body and extract a payload from the frame body, wherein the payload includes one or more MSDUs, or one MMPDU, or one MSDU fragment, or one MMPDU fragment.

In the present invention, a common MAC of MPDU frame header is designed to obtain a signaling format, which has complete functions and a simple structure and is easy to realize and expand, the signaling format, is applicable to a newly defined mid-short distance wireless communication system, reduces the processing complexity. As a result, the processing is simple and stable, the parse is convenient, it is not demanding for the system performance, and the system overhead is reduced, thus realizing the efficient transmission of the service and improving the utilization rate of the air interface resources.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunc-

DETAILED DESCRIPTION OF SPECIFIC EMBODIMENTS

The description below and accompanying drawings fully illustrate specific embodiments of the invention, to enable one skilled in the art to implement the embodiments. Modifications, such as structural, logical, electrical and process modifications, can be made in other embodiments. The embodiments represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

The following terms and definitions apply to the present invention.

MAC refers to Media Access Control;

MAC Protocol Data Unit (PDU), MPDU: a data unit exchanged between two peer MAC entities using PHY layer services.

MAC Management Protocol Data Unit (MPDU), MMPDU: a data unit exchanged between two peer MAC entities to realize MAC management protocol;

MAC Service Data Unit (SDU), MSDU: the information delivered as units between MAC Service Access Points (SAPs);

PHY refers to a Physical layer;

PDU refers to a Protocol Data Unit;

Central Access Point (CAP): an entity providing an access service for accessing stations;

Station (STA): a terminal device containing MAC and PHY functional interfaces and able to communicate with a CAP;

FID refers to a Flow identifier (i.e. FLOW ID);

FCS refers to a Frame Check Sequence;

MIMO refers to Multiple Input Multiple Output;

OFDM refers to Orthogonal Frequency Division Multiplexing;

QoS refers to Quality of service; and

ARQ refers to an Automatic Repeat Request.

A First Embodiment

The first embodiment of the present invention provides a newly defined mid-short distance wireless communication system.

1. Protocol Structure of Mid-Short Distance Wireless Communication System

Figure 1:
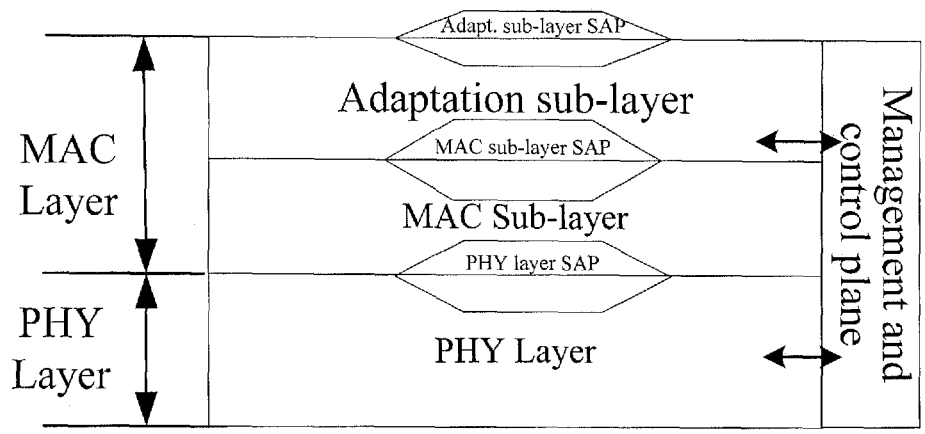
FIG. 1 is a schematic diagram showing the system architecture of a mid-short distance wireless communication system according to a first embodiment of the invention.

The reference model of the system is shown FIG. 1, where the main functions of each layer are described as follows.

A MAC layer includes an adaptation sub-layer and a MAC sub-layer.

The adaptation sub-layer takes a function of mapping and transforming between external network data and MAC Service Data Unit (MSDU).

The MAC sub-layer not only takes a media access control function, also manages and controls the system as well as supports specific functions of the PHY layer.

The PHY layer mainly provides a PHY transmission mechanism for mapping MAC layer protocol data units (MPDUs) to the corresponding physical channel, and adopts OFDM and MIMO technologies.

The MAC layer is the middle layer located between an upper layer and the PHY layer for receiving and sending, and is used to manage and control the distribution and sharing of transmission resources at the physical layer among multiple users. In order to support a multi-media service with QoS guarantee and high transmission efficiency in the mid-short distance wireless communication system, an efficient MAC protocol needs to be designed. Therefore, the present invention mainly relates to the MAC processing for the system with a high rate and a high data throughput.

MAC layer units and PHY units are essential for the realization of the mid-short distance wireless communication system with a high data throughput. The following mainly describes the design of a MAC layer unit applicable to the mid-short distance high-speed wireless communication system.

Figure 2:
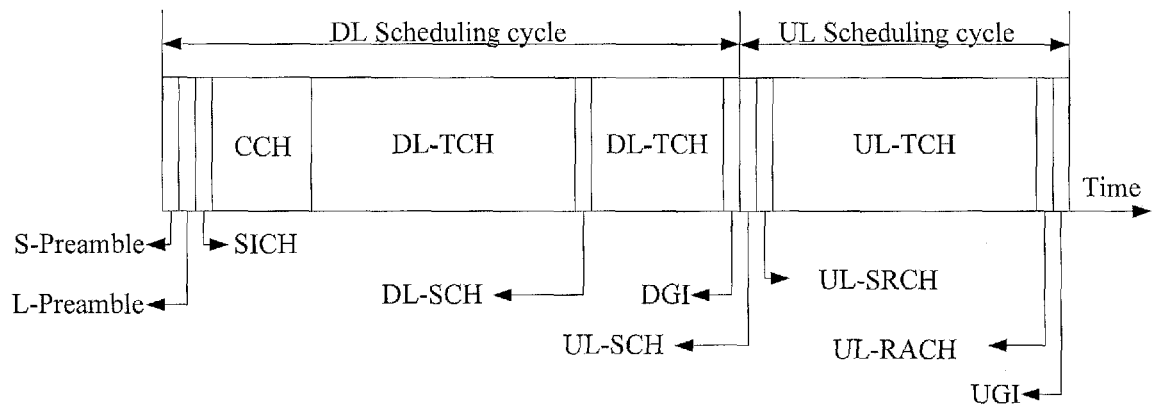
FIG. 2 shows the structure of a physical (PHY) layer frame in the mid-short distance wireless communication system according to the first embodiment of the invention.

Referrer to FIG. 2, which shows the structure of a PHY layer frame of the newly defined mid-short distance wireless communication system, and the definition of each sub-channel in the frame structure is shown in Table 1.

TABLE 1

| Name of channel | Function |
| --- | --- |
| Short preamble sequence S-Preamble | Coarse synchronizing of system |
| Long preamble sequence L-Preamble | Fine synchronizing of system and channel estimation |
| System information channel SICH | 1. Configuration of broadcast frame structure |
| Transmission control channel CH | 1. scheduling of uplink transmission channel resources<br>2. scheduling of downlink transmission channel resources |
| Downlink sounding channel DL-SCH | 1. Downlink channel measurement |
| Uplink sounding channel UL-SCH | 1. Uplink channel measurement |
| Uplink scheduling request channel UL-SRCH | 1. Uplink scheduling request |
| Uplink random access channel UL-RACH | 1. STA initial access |
| Downlink transmission channel DL-TCH | 1. Downlink service transmission<br>2. Downlink signaling transmission |
| Uplink transmission channel UL-TCH | 1. Uplink service transmission<br>2. Uplink feedback transmission |
| Downlink guard interval DGI | 1. Downlink to uplink transceiver guard interval |
| Uplink guard interval UGI | 1. Uplink to downlink transceiver guard interval |

Figure 3:
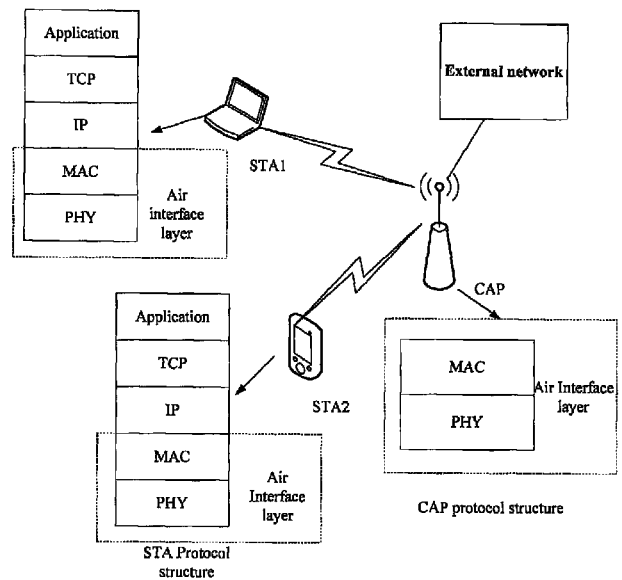
FIG. 3 is a schematic diagram showing the protocol structures of a user station and an access point in the mid-short distance wireless communication system according to the first embodiment of the invention.

Generally, the access system of the mid-short distance wireless communication system is composed of a CAP and STAs, and the STA includes the existing various data equipment, such as PDA, notebook, camera, video camera. As shown in FIG. 3, a STA1 and a STA2 access to the CAP through an air interface protocol, and the CAP establishes communication with an external network (such as an IP backbone network and an Ethernet) through a wire or wireless manner. Here, the protocol of the CAP includes an air interface layer, including a MAC layer and a PHY layer. The protocol of the STA includes an application layer (Application), a transmission control protocol (TCP) layer, an Internet Protocol (IP) layer, a MAC layer and a PHY layer.

Figure 4:
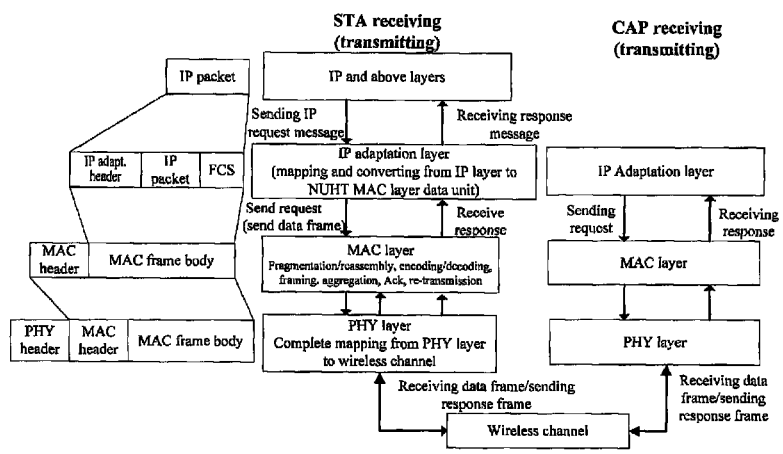
FIG. 4 shows the process of sending and receiving protocol data between a station (STA) and a Central Access Point (CAP) in the mid-short distance wireless communication system according to the first embodiment of the invention.

Based on such protocol composition, FIG. 4 gives the process of sending and receiving protocol data between the STA and the CAP. For example, if the STA is to send data to the CAP, the STA processes and packages the application data (such as VoIP, video, etc.) through the application layer and TCP/IP layer, and sends the formed IP packet to the IP adaptation layer, where the IP packet is transformed, mapped, and sent to the MAC layer, and then the MAC layer mapped IP packet undergoes operations such as fragment, encryption, framing and aggregation and sent to the PHY layer, and finally mapped by the PHY layer onto the wireless channel for data transmission.

2. Function Design of MAC Layer Unit

The MAC layer is used to manage and control the distribution and sharing of transmission resources on the physical layer among multiple users. In order to support multi-media services with QoS guarantee and high transmission efficiency, the MAC layer defined herein has the following characteristics:

The system uses the centralized control architecture oriented to multi-user scheduling; and The MAC layer of the system provides a connection-oriented service and supports QoS of services with different priorities.

Figure 5:
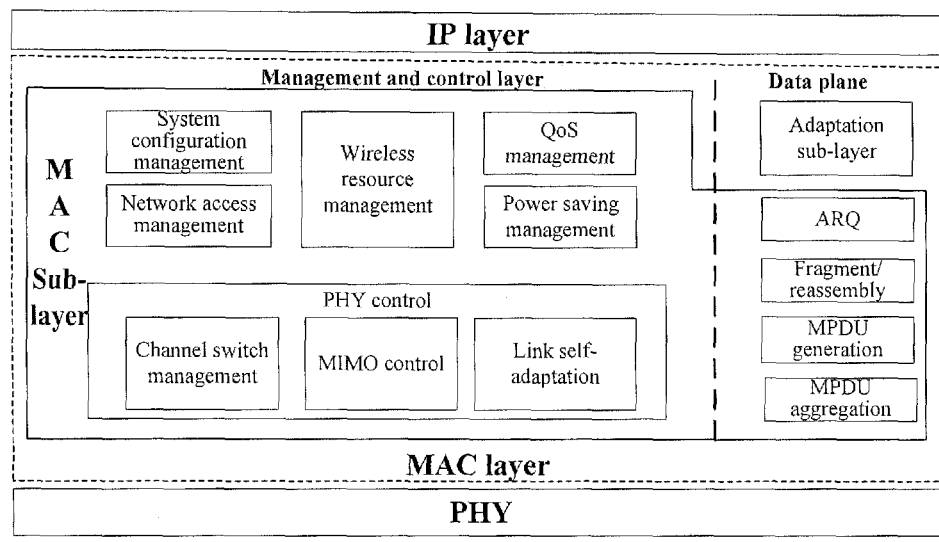
FIG. 5 is a diagram showing the MAC layer function structure in the mid-short distance wireless communication system according to the first embodiment of the invention.

The structural diagram of the function of the MAC sub-layer unit of the mid-short distance wireless communication system is shown in FIG. 5:

The MAC layer includes an adaptation sub-layer and a MAC sub-layer.

Adaptation Sub-Layer

The adaptation sub-layer uses the service provided by the MAC sub-layer. The adaptation sub-layer completes the following functions of:

receiving an SDU from the upper layer;

classifying the received upper layer SDU;

sending a PDU generated at the adaptation sub-layer to the MAC sub-layer; and receiving an SDU from the adaptation sub-layer in a peer entity.

MAC Sub-Layer

The basic functions of the MAC sub-layer are categorized into a management control plane and a data plane.

The management control plane includes the following functions of:

system configuration, i.e. managing the system configuration information and exchanging the system configuration information with the station;

wireless resource management, i.e. to complete the service scheduling function, complete the resource distribution based on service parameters and channel conditions, and implement functions such as load equalization and access control;

access management, i.e. initiation and access flow, to generate messages required by the access flow, including access code selection, capability negotiation, etc.;

QoS management, i.e. to manage QoS parameters of the service and maintain the establishment, modification and deletion of each service flow;

power-saving management, i.e. to control an STA without service to enter its dormant state, and return to an active state from the dormant state; and PHY layer control, mainly including the following sub-functions of:

channel management, which includes channel switching, and management of spectrum measurement and message report; and MIMO management, i.e. channel sounding mechanism, MIMO working mode determining and selecting, link self-adaptation, CQI measurement and feedback, MCS selection and feedback, and power control and management.

The data plane includes the following functions of:

Automatic Repeat Request (ARQ), i.e. operations of acknowledgement and retransmission of MPDU from the MAC layer or fragmented/aggregated MPDU;

fragment/reassembly, i.e. to fragmentate and send the upper layer service data unit to the next processing module at the transmitting terminal according to the scheduling result, and reassemble multiple fragments at the receiving terminal;

MPDU generation, i.e. to encapsulate the upper layer service unit into a basic MAC frame and send the basic MAC frame to the next processing module; and MPDU aggregation, i.e. to aggregate the upper layer service data units according to the scheduling result at the transmitting terminal.

3. MAC Frame Structure

In order to realize the functions of each module in the MAC sub-layer unit of the mid-short distance wireless communication system as previously defused, the present invention specifically designs a type of MAC Protocol Data Unit (MPDU) applicable to the high-speed data transmission network with a high capacity, and the functions of each module in the system are implemented through interactions between MPDUs for different functions, thus realizing the functions of the mid-short distance wireless communication system.

The data transferred between the N-th layer protocols is called a Service Data Unit (SDU), while the data transferred between the N-th layer protocol entities is called Protocol Data Unit (PDU).

The MPDU is applicable to wireless communication between communication peers, namely, a transmitting terminal and a receiving terminal. The transmitting terminal is for example the CAP or STA in the present invention; and the receiving terminal is also for example the CAP or STA in the present invention. Both communication peers negotiate the frame format of MPDU in advance, and during each communication, the transmitting terminal assigns value to each field of the pre-negotiated MPDU to obtain an MPDU for sending, and the receiving terminal parses the received MPDU, so that the communication between both peers is implemented.

Figure 6:
FIG. 6 is a structural representation of a MAC frame according to the first embodiment of the invention.

The MPDU designed in the present invention provides a frame structure for high-speed data transmission with a high capacity. FIG. 6 shows the frame format for encapsulation of MPDU at the MAC layer. As shown in FIG. 6, each MPDU may be divided into three parts, i.e., a first part which is the common MAC frame header of a fixed length; a second part which is the frame body used to carry the payload carried by the MPDU; and a third part which is the Frame Check Sequence (FCS) information. The bits contained in all the fields in the MAC frame are numbered in an order from low to high, and sent to the physical layer in the same order from low to high. The bits in one byte are sent to the physical layer in the sequence from left (LSB) to right (MSB). Bits contained in the same field correspond to a decimal number according to the numbering sequence from low to high, for example, if bits b9-b11-000, bits b9-b11 correspond to 0; and if bits b9-b11-001, bits b9-b11 correspond to 4.

The MAC frame header refers to the part in the MPDU other than the frame body and FCS.

Figure 7:
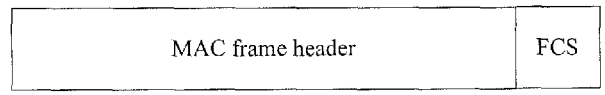
FIG. 7 is another structural representation of a MAC frame according to the first embodiment of the invention.
Figure 8:
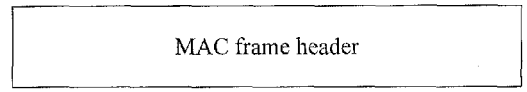
FIG. 8 is another structural representation of a MAC frame structure according to the first embodiment of the invention.

The second part, i.e. the frame body, is used to carry the payload carried by the MPDU, namely, data or management message contents need to be delivered. Preferably, the payload includes one or more MSDUs, or one MMPDU, or one MSDU fragment, or one MMPDU fragment. The mid-short distance wireless communication system allows for a payload of a fixed length or a variable length, therefore, the length of the entire MPDU can be fixed or variable. When the length of the frame body field is variable, the minimum length of the frame body is 0 byte, and the maximum length of the frame body is 4095 bytes. This enables the MAC layer of the mid-short distance wireless communication system to process any type of upper layer service, without the knowledge of the specific format or bit coding mode of the carried message. In addition, the payload in the MPDU in the mid-short distance wireless communication system is optional. For some management control frames, the occurrence of a MAC frame header not accompanied by a frame body is allowed, as shown in FIG. 7, that is, only the MAC frame header and the FCS are included, or even only the MAC frame header is included as shown in FIG. 8.

The FCS field is used for frame check.

The FCS field is a field of 32 bits, including a 32-bit CRC. The FCS is calculated from all the fields of the MAC frame header and the frame body.

The FCS is obtained by the following standard polynomial of an order of 32:

$$G(x)=x32+x26+x23+x22+x16+x12+x11+x10+x8+x7+x5+x4+x2+x+1.$$

The initial state of the register is 0xFFFFFFFF; after completion of operations, the state of the register is subjected to a logical NOT operation and outputted as the FCS field. The FCS field is sent out a byte sequence from a high order to a low order.

A Second Embodiment

Figure 9:
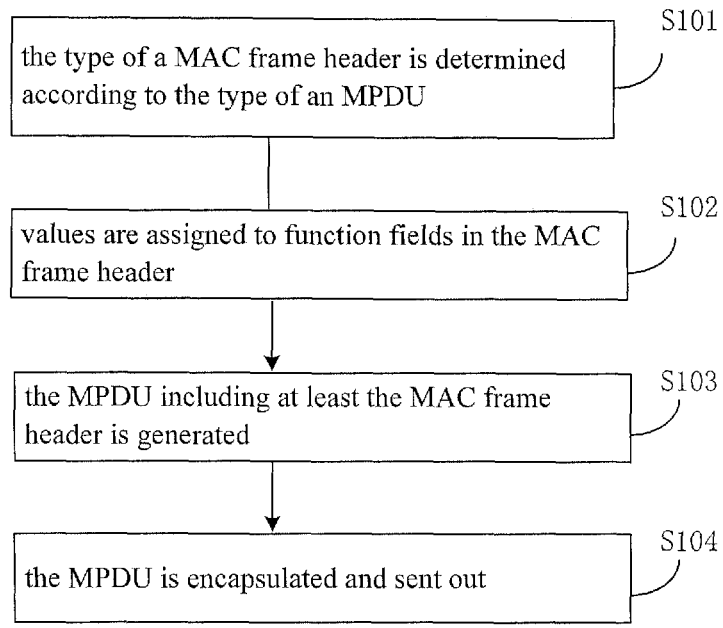
FIG. 9 is a schematic flow chart of a wireless communication method according to a second embodiment of the invention.

The second embodiment of the present invention provides a wireless communication method, as shown in FIG. 9, and the method includes S101-S104 below.

At Step S101, the type of a MAC frame header is determined according to the type of an MPDU.

Preferably, the type of the MPDU is determined according to the contents to be sent.

Preferably, the contents to be sent include an upper-layer protocol data unit or MAC layer management message.

At Step S102, value is assigned to function fields in the MAC frame header to generate the MAC frame header.

Preferably, the type of the MPDU indicates two types of frames having different MAC frame header lengths.

Preferably, the length L1 of a MAC frame header of a first one of the two types of frames and the length L2 of a MAC frame header of a second one of the two types of frames are fixed, and the length L1 is smaller than the length L2.

Preferably, the MAC frame header of the first type of frame is composed of a field carrying frame type information, a field carrying sub-type information, a field carrying protocol version information and a field carrying flow identification information.

The protocol version information is used to indicate the current standard protocol version.

The frame type information and the sub-type information are used to indicate the function type of the frame.

The flow identification information is used to indicate the specific uplink or downlink service flow to which the current frame pertains.

Preferably, the MAC frame header of the first type of frame is composed of a field carrying frame type information, a field carrying sub-type information, a field carrying protocol version information, a field carrying flow identification information and a field carrying repeat indication information.

The repeat indication information is used to indicate that the current frame is a retransmission of the previous frame.

Preferably, the MAC frame header of the second type of frame is composed of a field carrying frame type information, a field carrying sub-type information, a field carrying protocol version information, a field carrying flow identification information, a field carrying fragment number information, a field carrying sequence number information, a field carrying fragment indication information and a field carrying length information.

The fragment number information is used to indicate the sequence number of each fragment in a MAC service data unit (MSDU) or a MAC management protocol data unit (MMPDU).

The sequence number information is used to indicate the sequence number of the MAC service data unit (MSDU) or the MAC management protocol data unit (MMPDU).

The fragment indication information indicates if any subsequent fragment of the current MAC service data unit (MSDU) or MAC management protocol data unit (MMPDU) exists.

The length information is used to indicate the total bytes of all the fields between the MAC frame header field and the FCS field.

Preferably, the MAC frame header of the second type of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information.

The frame type information and the sub-type information may be carried in the same field or different fields.

At Step S103, the MPDU including at least the MAC frame header is generated.

At Step S104, the MPDU is encapsulated and sent out.

Preferably, Step S102 also includes: determine CRC information of the MPDU according to the MAC frame header, and obtaining the frame check sequence (FCS), where the MPDU generated at Step S103 at least includes the MAC frame header and the FCS.

Some embodiments also provide a wireless communication method, including Steps S201-S203 below.

Step S201: determine the type of the MAC frame header according to the type of the MPDU.

Preferably, the type of the MPDU is determined according to the contents to be sent.

Step S202: assigning values to function fields in the MAC frame header to generate the MAC frame header;

A payload is filled in the frame body of the MPDU according to the contents to be sent.

Here, the composition of the MAC frame header is the same with that as described in the first embodiment, and thus will not be further described here.

The payload includes one or more MAC service data units (MSDUs), or one management protocol data unit (MMPDU), or one MSDU fragment, or one MMPDU fragment.

Step S203: generating the MPDU including at least the MAC frame header and the frame body.

Preferably, Step S202 also includes: determining the CRC information of the MPDU according to the MAC frame header and the frame body, and obtaining FCS; where the MPDU generated in Step S203 at least includes the MAC frame header and the FCS.

A Third Embodiment

Figure 10:
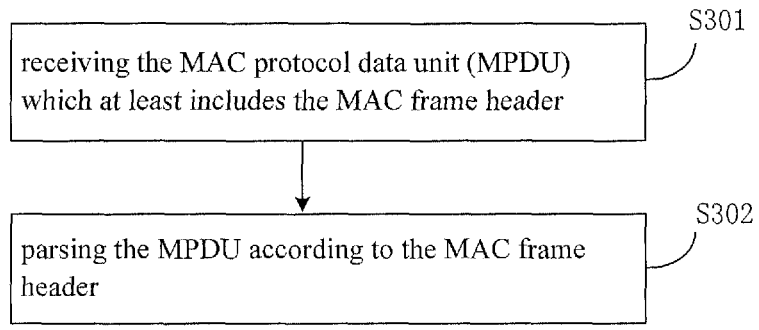
FIG. 10 is a schematic flow chart of a wireless communication method according to a third embodiment of the invention.

The third embodiment of the present invention provides a wireless communication method, as shown in FIG. 10, including Steps S301-S302.

Step S301: receiving the MAC protocol data unit (MPDU) which at least includes the MAC frame header.

Preferably, the MPDU at least includes the MAC frame header and the frame body.

Step S302: parsing the MPDU according to the MAC frame header, and determining the type of the MPDU.

Preferably, the type of the MPDU indicates two types of frames having different MAC frame header lengths.

Preferably, the Length L1 of a MAC frame header of a first one of the two types of frames and the Length L2 of a MAC frame header of a second one of the two types of frames are fixed, and the length L1 is smaller than the length L2.

Preferably, the MAC frame header of the first type of frame is composed of a field carrying frame type information, a field carrying sub-type information, a field carrying protocol version information and a field carrying flow identification information.

The protocol version information is used to indicate the current standard protocol version.

The frame type information and the sub-type information are used to indicate the function type of the frame.

The flow identification information is used to indicate an uplink or downlink service flow.

Preferably, the MAC frame header of the first type of frame is composed of a field carrying frame type information, a field carrying sub-type information, a field carrying protocol version information, a field carrying flow identification information and a field carrying repeat indication information.

The repeat indication information is used to indicate that the current frame is a retransmission of the previous frame.

Preferably, the MAC frame header of the second type of frame is composed of a field carrying frame type information, a field carrying sub-type information, a field carrying protocol version information, a field carrying flow identification information, a field carrying fragment number information, a field carrying sequence number information, a field carrying fragment indication information and a field carrying length information.

The fragment number information is used to indicate the sequence number of each fragment in the MAC service data unit (MSDU) or the MAC management protocol data unit (MMPDU).

The sequence number information is used to indicate the sequence number of the MSDU or the MMPDU.

The fragment indication information indicates if any subsequent fragment of the current MSDU or MMPDU exists.

The length information is used to indicate the total bytes of all the fields between the MAC frame header field and the FCS field.

Preferably, the MAC frame header of the second type of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information.

The frame type information and the sub-type information may be carried in the same field or different fields.

Preferably, when the MPDU at least includes the MAC frame header and the frame body, Step S302 also includes parsing the MAC frame body to extract the payload from the frame body.

The payload includes one or more MSDUs, or one MMPDU, or one MSDU fragment, or one MMPDU fragment.

Preferably, if the MPDU further carries an FCS, a step of positioning the FCS according to the length information and carrying out CRC check on the MAC frame header and the frame body according to the FCS is further included.

The length information is the length information carried in the MPDU or the preset length information in the system.

Particularly, for the management control frame with a sequence number, the length information is the length information carried in the MPDU; and for the management control frame without sequence number, the length information is the preset length information in the system.

The specific description of the frame structure of the MPDU is provided in the following embodiments under different circumstances respectively.

A Fourth Embodiment

Figure 11:
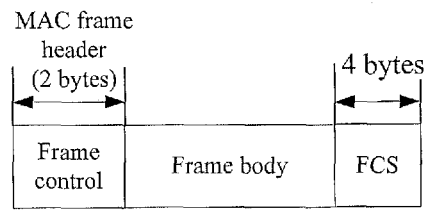
FIG. 11 is a structural representation of a MAC frame structure according to a forth embodiment of the invention.

The fourth embodiment of the present invention provides a common MAC frame of a fixed length, as shown in FIG. 11, including a MAC frame header, a frame body and an FCS field. The MAC frame header at least includes a frame control field used to indicate the control information of the current MPDU.

Each MAC frame header in the embodiment of the present invention may include the frame control field.

Figure 12:
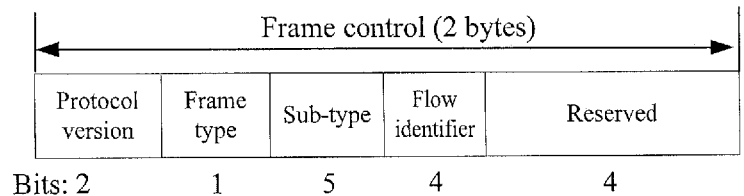
FIG. 12 is a schematic structural representation of a frame control field according to the fourth embodiment of the invention.

As shown in FIG. 12, the frame control field is specifically composed of the following fields: a protocol version field, a frame type field, a sub-type field and a flow identification field.

(1) Protocol Version Field

The protocol version field is used to indicate the current standard protocol version, to enable the receiving terminal to communicate with the transmitting terminal according to the corresponding MAC protocol.

The length of the protocol version field is 2 bits.

(2) Frame Type Field

The frame type field is used to identify the function type of the frame, to enable the receiving terminal to identify the corresponding frame.

There are two types of frames, i.e. management control frames and data frames.

The length of the frame type field is 1 bit.

(3) Sub-Type Field

The length of the sub-type field is 5 bits.

This sub-type field is used to identify the function type of the frame together with the frame type field.

Under each frame type, there are several sub-types. For example, Table 2 presents various effective combinations of the type and the sub-type as follows:

TABLE 2

| Type b2 | Type description | Value of sub-type b7 b6 b5 b4 b3 | Description of sub-type |
| --- | --- | --- | --- |
| 0 | Management Control | 00000 | Broadcast information frame (BCF) |
| | | 00001 | Random access request frame (RA_REQ) |
| | | 00010 | Random access response frame (RA_RSP) |
| | | 00011 | Terminal basic capacity negotiation request frame (SBC_REQ) |
| | | 00100 | Terminal basic capacity negotiation response frame (SBC_RSP) |
| | | 00101 | Dynamic service Addition request frame (DSA_REQ) |
| | | 00110 | Dynamic service Addition response frame (DSA_RSP) |
| | | 00111 | Dynamic service Change request frame (DSC_REQ) |
| | | 01000 | Dynamic service Change response frame (DSC_RSP) |
| | | 01001 | Dynamic service deletion request frame (DSD_REQ) |
| | | 01010 | Dynamic service deletion response frame (DSD_RSP) |
| | | 01011 | Independent resource request frame (RES_REQ) |
| | | 01100 | Multi-input multi-output feedback frame based on channel state information (CSI_MIMO) |
| | | 01101 | Channel quality feedback frame (CQI_FB) |
| | | 01110 | Reserved |
| | | 01111 | Feedback frame based on beamforming matrix (BFM_MIMO) |
| | | 10000 | Acknowledge frame (ACK) |
| | | 10001 | Group acknowledge request frame (GroupAckReq) |
| | | 10010 | Group acknowledge frame (GroupAck) |

TABLE 2-continued

| Type b2 | Type description | Value of sub-type b7 b6 b5 b4 b3 | Description of sub-type |
|---|---|---|---|
| | | 10011 | Network quitting frame (Quit) |
| | | 10100 | Channel switch informing frame (CSW_INF) |
| | | 10101 | Sleep request frame (SLP_REQ) |
| | | 10110 | Sleep response frame (SLP_RSP) |
| | | 10111 | Downlink service indication frame (DTF_IND) |
| | | 11000~11111 | Reserved |
| 1 | Data | 00000 | Data frame (DATA) |
| | | 00001 | Data padding frame (PAD_DATA) |
| | | 00010~11111 | Reserved |

Management control frames include management control frames with a sequence number and management control frames without sequence number.

Specifically, the management control frames with a sequence number include a broadcast information frame, a multi-input multi-output feedback frame based on channel state information, a feedback frame based on beamforming matrix and a channel quality feedback frame.

The management control frames without sequence number include a random access request frame, a random access response frame, a terminal basic capacity negotiation request frame, a terminal basic capacity negotiation response frame, a dynamic service establishment request frame, a dynamic service establishment response frame, a dynamic service correction request frame, a dynamic service correction response frame, a dynamic service deletion request frame, a dynamic service deletion response frame, an independent resource request frame, an acknowledge frame, a group acknowledge request frame, a group acknowledge frame, a network quitting frame, a channel switch informing frame, a sleep request frame, sleep response frame and a downlink service indication frame.

The management control frame without sequence number has a frame format as shown in FIG. 11, and includes a MAC frame header, a frame body and an FCS, and the MAC frame header includes a frame control field.

Figure 13:
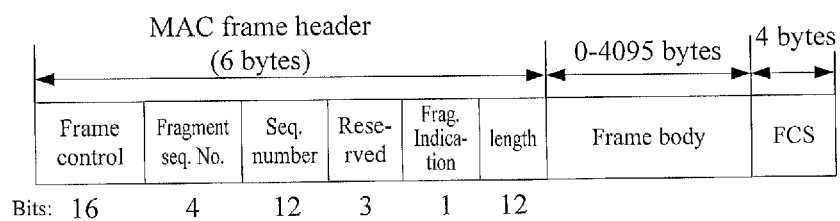
FIG. 13 is a schematic structural representation of another frame control field according to a fifth embodiment of the invention.

The management control frame with a sequence number has a frame format as shown in FIG. 13, and at least includes a MAC frame header and an FCS, and preferably further includes a frame body. The MAC frame header includes a frame control field, a fragment number field, a sequence number field, a reserved field, a fragment indication field and a length field.

When receiving a frame containing a frame type field and a sub-type field, the receiving terminal can determine whether the MPDU is a management control frame or a data frame, and the sub-type of the MPDU.

(4) Flow Identification Field

The flow identification field is used to identify the uplink or downlink service flow to which the current frame pertains, to enable the receiving terminal to identify the service flow to which the MPDU pertains.

The length of the flow identification field is 4 bits, particularly, a value of 0000 of these 4 bits is used for the management control frame, and values of 0001-1111 of these bits are used for the data frame.

(5) Reserved Field

The length of the reserved field is 4 bits.

In this Embodiment, the frame body may be included or not. If the frame body has a fixed length, the length of the frame body is preset in the system.

In this Embodiment, the FCS field may be included or not. FIG. 13 shows the FCS of 4 bytes for example.

A Fifth Embodiment

The fifth embodiment provides a MAC frame header, which includes a frame control field.

Figure 14:
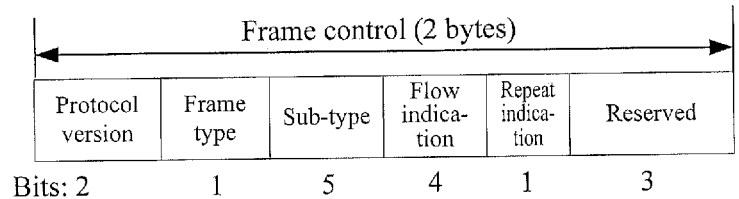
FIG. 14 is a schematic representation of a MAC frame structure according to a sixth embodiment of the invention.

As shown in FIG. 14, the frame control field is composed of a protocol type, a frame type, a sub-type, a flow identification and a repeat indication.

The repeat indication field is used to indicate whether the current frame is a retransmission of the previous frame, to enable the receiving terminal to distinguish the new frame from the repeated frame.

The length of the repeat indication field is 1 bit. If the current frame is the repeat version of the previous frame, the repeat indication field is set as 1; otherwise, the repeat indication field is set as 0.

A Sixth Embodiment

The sixth embodiment of the present invention provides another type of MAC frame.

As shown in FIG. 13, the MAC frame header is composed of a frame control field, a fragment number field, a sequence number field, a fragment indication field and a length field.

(1) Frame Control Field

The contents specifically included in the frame control field are the same as those described in the fourth and fifth embodiments, to which reference may be made and further description will not be provided again herein.

(2) Fragment Number Field

The fragment number field has a length of 4 bits (with a value of 0-5) and is used to indicate the number of each fragment of the MSDU or MMPDU. When the MSDU/MMPDU contains only one fragment, the fragment number is 0; when MSDU/MMPDU contains multiple fragments, the first fragment number is 0. The fragment numbers of fragments in the same MSDU or MMPDU are incremented by 1.

(3) Sequence Number Field

The sequence number field has a length of 12 bits with a value of 0-4095, and is used to indicate the sequence number of the MSDU MMPDU. Each MSDU or MMPDU sent in a FID flow is assigned with one sequence number. The sequence number of the first MSDU or MMPDU is 0, and the sequence numbers of the MSDU or MMPDU within the same FID flow are incremented by 1.

(4) Reserved Field

The reserved field has a length of 3 bits and is set as 0 by default.

(5) Fragment Indication Field, which is Used to Indicate Whether any Subsequent Fragment Exists.

The length of the fragment indication field is 1 bit. In all the data frames or management control frames with a sequence number, if any subsequent fragment of the current MSDU or MMPDU follows, the fragment indication field is set as 1; otherwise, the fragment indication field is set as 0.

With the fragment number field and the fragment indication field, the receiving terminal is enabled to determine whether to carry out the operation of fragment reassembly.

(6) Length Field

The length field contains 12 bits, and indicates the total bytes of all the fields between the MAC header field and the FCS field, to enable the receiving terminal to find out the complete MPDU.

In this Embodiment, the frame body may be included or not, and the frame body includes 0-4095 bytes; when the frame body is 0, it indicates that there is no frame body. The length of the frame body is indicated by the length field in the MAC frame header.

In this Embodiment, the FCS field may be included or not, and FIG. 13 shows the FCS field of 4 bytes for example.

A Seventh Embodiment

Figure 15:
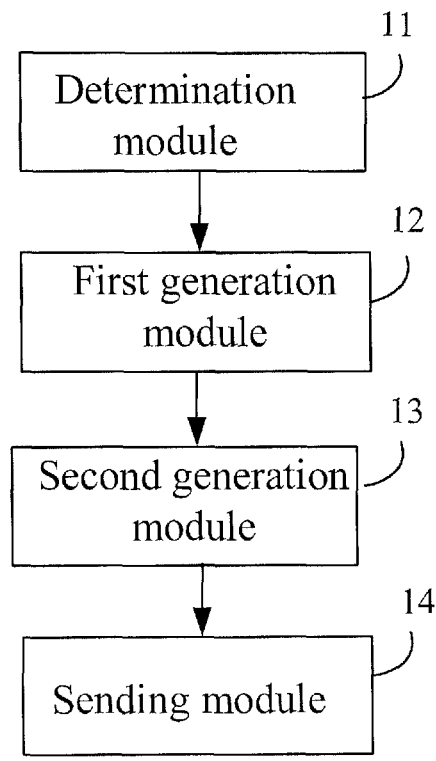
FIG. 15 is a structural representation of a transmitting device according to a seventh embodiment of the invention.

The seventh embodiment of the present invention provides a transmitting device, as shown in FIG. 15, including:

a determination module 11, which is used to determine the type of a MAC frame header according to the type of an MPDU; preferably, the determination module 11 is further used to determine the type of the MPDU according to the contents to be sent;

a first generation module 12, which is used for assigning a value to a function field in the MAC frame header, to generate the MAC frame header;

a second generation module 13, which is used to generate the MPDU at least including the MAC frame header; and a sending module 14, which is used to encapsulate and then send the MPDU.

Preferably, the determination module 11 is also used to determine the type of the MPDU according to the contents to be sent.

Preferably, the second generation module 13 is also used to fill the frame body of the MPDU with a payload according to the contents to be sent; the MPDU generated in Step S203 at least includes the MAC frame header and the frame body. The payload includes one or more MSDUs, or one MMPDU, or one MSDU fragment, or one MMPDU fragment.

Preferably, the second generation module 13 is also used to determine CRC information of the MPDU according to the MAC frame header and the frame body and obtain an FCS. The MPDU generated in Step S203 at least includes the MAC frame header and the FCS.

The transmitting device provided in the seventh embodiment of the present invention operates with principles and the related operating flow nearly the same as those described in the embodiments 1-6 of the wireless communication method, and additional introduction will not be provided herein.

An Eighth Embodiment

Figure 16:
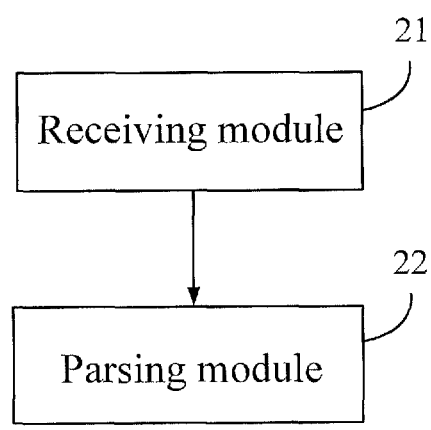
FIG. 16 is a structural representation of a receiving device according to an eighth embodiment of the invention.

The eighth embodiment of the present invention provides a receiving device, as shown in FIG. 16, including:

a receiving module 21, which is used to receive an MPDU, which at least includes a MAC frame header; and a parsing module 22, which is used to parse the MPDU according to the MAC frame header, and determine the type of the MPDU.

Preferably, the parsing module 22 is also used to parse the frame body and extract the payload from the frame body, and the payload includes one or more MSDUs, or one MMPDU, or one MSDU fragment, or one MMPDU fragment.

The receiving device provided in the eighth embodiment of the present invention operates with principles and the related operating flow nearly the same as those described in the embodiments 1-6 of the wireless communication method, and additional introduction will not be provided herein.

A Ninth Embodiment

The ninth embodiment of the present invention provides a wireless communication system, including: a transmitting device provided in the seventh embodiment and a receiving device provided in the eighth embodiment.

The wireless communication system provided in the ninth embodiment of the present invention operates with principles and the related operating flow nearly the same as those described in the embodiments 1-6 of the preceding wireless communication method, transmitting device and receiving device, and additional introductions will not be provided herein.

The embodiments of the present invention are described only with the example of the mid-short distance wireless communication system, but are not limited to the applicability to the mid-short distance wireless communication system, and other systems using the method of the present invention are within the protection scope of the invention.

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word. Addition-

The invention claimed is:

1. A method for wireless communications, the method comprising:
   determining, using a processor of a wireless system, a type of a Media Access Control (MAC) frame header according to a type of a MAC Protocol Data Unit (MPDU);
   assigning, using the processor of the wireless system, values to function fields in the MAC frame header, to generate the MAC frame header;
   generating, using the processor of the wireless system, the MPDU, which includes at least the MAC frame header; and
   encapsulating and then sending the MPDU
      wherein, the type of the MPDU indicates first and second types of frames having different MAC frame header lengths, and
      wherein, a length L1 of a MAC frame header of the first type and a length L2 of the MAC frame header of a second type are fixed, and the length L1 is smaller than the length L2, the MAC frame header of the first type is composed of a field carrying repeat indication information, the repeat indication information is used to indicate whether the current frame is a retransmission of a previous frame.

2. The method of claim 1, wherein, the MAC frame header of the first type is composed of a field carrying protocol version information, a field carrying frame type information, a field carrying sub-type information and a field carrying flow identification information, and wherein,
   the protocol version information is used to indicate the current standard protocol version;
   the frame type information and the sub-type information are used to indicate the function type of the frame;
   the flow identification information is used to indicate a specific uplink or downlink service flow to which the current frame pertains.

3. The method of claim 1, wherein, the MAC frame header of the second type is further composed of a field carrying protocol version information, a field carrying frame type information, a field carrying sub-type information, a field carrying flow identification information, a field carrying fragment number information, a field carrying sequence number information, a field carrying fragment indication information and a field carrying length information; and wherein,
   the protocol version information is used to indicate the current standard protocol version;
   the frame type information and the sub-type information are used to indicate the function type of the frame;
   the flow identification information is used to indicate a specific uplink or downlink service flow to which the current frame pertains;
   the fragment number information is used to indicate the number of each fragment of a Mac Service Data Unit (MSDU) or a Mac Management Protocol Data Unit (MMPDU);
   the sequence number information is used to indicate a sequence number of the MSDU or MMPDU;
   the fragment indication information is used to indicate if any subsequent fragment of the current MSDU or MMPDU exists;
   the length information is used to indicate the total bytes of all fields between the MAC frame header field and a Frame Check Sequence (FCS) field.

4. The method of claim 1, wherein the MAC frame header of the second type is further composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, and wherein,
   the protocol version information is used to indicate the current standard protocol version;
   the frame type information and the sub-type information are used to indicate the function type of the frame;
   the flow identification information is used to indicate a specific uplink or downlink service flow to which the current frame pertains;
   the repeat indication information is used to indicate whether the current frame is a retransmission of a previous frame;
   the fragment number information is used to indicate the number of each fragment of the MSDU or MMPDU;
   the sequence number information is used to indicate the sequence number of the MSDU or MMPDU;
   the fragment indication information indicates if any subsequent fragment of the current MSDU or MMPDU exists;
   the length information is used to indicate the total bytes of all fields between the MAC frame header field and a FCS field.

5. The method of claim 1 further comprising:
   determining the type of the MPDU according to the contents to be sent.

6. The method of claim 5 further comprising:
   filling the frame body of the MPDU with a payload according to the contents to be sent, wherein the MPDU at least includes the MAC frame header and the frame body, and the payload includes one or more MSDUs, or one MMPDU, or one MSDU fragment, or one MMPDU fragment.

7. A method for wireless communications, the method comprising:
   receiving, using a processor of a wireless system, a MAC Protocol Data Unit (MPDU), which at least includes a Media Access Control (MAC) frame header; and
   parsing, using the processor of the wireless system, the MPDU according to the MAC frame header, and determining a type of the MPDU, wherein the type of the MPDU indicates first and second types of frames having different MAC frame header lengths, wherein, a Length L1 of a MAC frame header of the first type and a Length L2 of a MAC frame header of the second type are fixed, and the length L1 is smaller than the length L2, the MAC frame header of the second type is composed of a field carrying a field carrying repeat indication information, the repeat indication information is used to indicate whether the current frame is a retransmission of a previous frame.

8. The method of claim 7, wherein, the MAC frame header of the first type is composed of a field carrying protocol version information, a field carrying frame type information, a field carrying sub-type information and a field carrying flow identification information; or, the MAC frame header of the first type is further composed of a field carrying frame type information, a field carrying sub-type information, a field carrying protocol version information, a field carrying flow identification information and a field carrying repeat indication information; or, the MAC frame header of the second type is composed of a field carrying protocol version information, a field carrying frame type information, a field carrying sub-type information, a field carrying flow identification information, a field carrying fragment number information, a field carrying sequence number information, a field carrying fragment indication information and a field carrying length information; or, the MAC frame header of the second one of the two types of frame is composed of a field carrying frame type information, a field carrying sub-type information, a field carrying protocol version information, a field carrying flow identification information, a field carrying fragment number information, a field carrying sequence number information, a field carrying fragment indication information and a field carrying length information, and wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate the number of each fragment of a Mac Service Data Unit (MSDU) or a Mac Management Protocol Data Unit (MMPDU);

the sequence number information is used to indicate a sequence number of the MSDU or MMPDU;

the fragment indication information is used to indicate if any subsequent fragment of the current MSDU or MMPDU exists;

the length information is used to indicate the total bytes of all fields between the MAC frame header field and a Frame Check Sequence (FCS) field.

9. The method of claim 7, wherein, the MPDU further comprises a frame body, and the method further comprises:

parsing the frame body and extracting a payload from the frame body, wherein the payload includes one or more MSDUs, or one MMPDU, or one MSDU fragment, or one MMPDU fragment.

10. A transmitting device, comprising:

a determination module configured to determine a type of a Media Access Control (MAC) frame header according to a type of a MAC Protocol Data Unit (MPDU);

a first generation module configured to values to function fields in the MAC frame header to generate the MAC frame header;

a second generation module configured to generate the MPDU, which at least includes the MAC frame header; and a sending module configured to encapsulate and then send the MPDU, wherein, the type of the MPDU indicates first and second types of frames having different MAC frame header lengths, a Length L1 of a MAC frame header of the first type and a Length L2 of a MAC frame header of the second type are fixed, and the length L1 is smaller than the length L2, wherein, the MAC frame header of the first type is composed of a field carrying flow identification information and a field carrying repeat indication information, the repeat indication information is used to indicate whether the current frame is retransmission of a previous frame.

11. The transmitting device of claim 10, wherein the MAC frame header of the first type is further composed of a field carrying protocol version information, a field carrying frame type information, a field carrying sub-type information and a field carrying flow identification information; or, the MAC frame header of the first type is composed of a field carrying frame type information, a field carrying sub-type information, a field carrying protocol version information, and a field carrying flow identification information; or, the MAC frame header of the second type is composed of a field carrying protocol version information, a field carrying frame type information, a field carrying sub-type information, a field carrying flow identification information, a field carrying fragment number information, a field carrying sequence number information, a field carrying fragment indication information and a field carrying length information; or, the MAC frame header of the second type is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, and wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate the number of each fragment of a Mac Service Data Unit (MSDU) or a Mac Management Protocol Data Unit (MMPDU);

the sequence number information is used to indicate the sequence number of the MSDU or MMPDU;

the fragment indication information indicates if any subsequent fragment of the current MSDU or MMPDU exists;

the length information is used to indicate the total bytes of all fields between the MAC frame header field and a Frame Check Sequence (FCS) field.

12. A receiving device, comprising:

a receiving module configured to receive a MAC Protocol Data Unit (MPDU), which at least includes a Media Access Control (MAC) frame header; and a parsing module configured to parse the MPDU according to the MAC frame header and determine a type of the MPDU, wherein, the type of the MPDU indicates first and second types of frames having different MAC frame header lengths, a Length L1 of a MAC frame header of the first type and a Length L2 of a MAC frame header of the second type are fixed, and the length L1 is smaller than the length L2, and wherein, the MAC frame header of the first type is composed of a field carrying repeat indication information, the repeat indication information is used to indicate whether the current frame is a retransmission of a previous frame.

13. The receiving device of claim 12, wherein, the MAC frame header of the first type is composed of a field carrying protocol version information, a field carrying frame type information, a field carrying sub-type information and a field carrying flow identification information; or, the MAC frame header of the first type is composed of a field carrying frame type information, a field carrying sub-type information, a field carrying protocol version information, and a field carrying flow identification information; or, the MAC frame header of the second type is composed of a field carrying protocol version information, a field carrying frame type information, a field carrying sub-type information, a field carrying flow identification information, a field carrying fragment number information, a field carrying sequence number information, a field carrying fragment indication information and a field carrying length information; or, the MAC frame header of the second one of the two types of frame is composed of a field carrying frame type information, a field carrying sub-type information, a field carrying protocol version information, a field carrying flow identification information, a field carrying repeat indication information, a field carrying fragment number information, a field carrying sequence number information, a field carrying fragment indication information and a field carrying length information, and wherein, the protocol version information is used to indicate the current standard protocol version;

the frame type information and the sub-type information are used to indicate the function type of the frame;

the flow identification information is used to indicate a specific uplink or downlink service flow to which the current frame pertains;

the fragment number information is used to indicate the number of each fragment of a Mac Service Data Unit (MSDU) or a Mac Management Protocol Data Unit (MMPDU);

the sequence number information is used to indicate the sequence number of the MSDU or MMPDU;

the fragment indication information indicates if any subsequent fragment of the current MSDU or MMPDU exists;

the length information is used to indicate the total bytes of all fields between the MAC frame header field and a Frame Check Sequence (FCS) field.

* * * * *